(12) United States Patent
Watanabe et al.

(10) Patent No.: US 11,318,406 B2
(45) Date of Patent: May 3, 2022

(54) HEATER-INTEGRATED FILTER AND ROTATING MACHINE SYSTEM

(71) Applicant: MITSUBISHI HEAVY INDUSTRIES COMPRESSOR CORPORATION, Tokyo (JP)

(72) Inventors: Takuya Watanabe, Hiroshima (JP); Yusaku Sano, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 567 days.

(21) Appl. No.: 16/467,726

(22) PCT Filed: Feb. 24, 2017

(86) PCT No.: PCT/JP2017/007195
§ 371 (c)(1),
(2) Date: Jun. 7, 2019

(87) PCT Pub. No.: WO2018/154729
PCT Pub. Date: Aug. 30, 2018

(65) Prior Publication Data
US 2020/0061514 A1   Feb. 27, 2020

(51) Int. Cl.
*B01D 50/00* (2022.01)
*B01D 46/42* (2006.01)
(Continued)

(52) U.S. Cl.
CPC .............. *B01D 46/42* (2013.01); *B01D 45/12* (2013.01); *B01D 46/003* (2013.01);
(Continued)

(58) Field of Classification Search
CPC ...... B01D 46/42; B01D 45/12; B01D 46/003; B01D 46/4263; F04D 17/10; F04D 29/083; F04D 29/10; F24H 3/002; F24H 3/00
See application file for complete search history.

(56) References Cited

U.S. PATENT DOCUMENTS 4,119,419 A * 10/1978 Passaro .............. B01D 46/4263
                                                           131/238
6,524,059 B1    2/2003 Nogiwa
(Continued)

FOREIGN PATENT DOCUMENTS

JP    S40-015997 Y    6/1965
JP    S60-030952 U    3/1985
(Continued)

OTHER PUBLICATIONS

International Search Report and Written Opinion in corresponding International Application No. PCT/JP2017/007195, dated Apr. 25, 2017 (14 pages).

*Primary Examiner* — Dung H Bui
(74) *Attorney, Agent, or Firm* — Osha Bergman Watanabe & Burton LLP (57) ABSTRACT

A heater-integrated filter includes: a casing in which are formed an intake port for taking in a portion of process gas from a compressor and a discharge port for discharging the process gas; a filter body which is provided inside the casing and through which the process gas from the intake port passes; and rod-like heaters which are disposed inside the casing and along which the process gas that has passed through the filter body is capable of flowing toward the discharge port along the extension direction.

7 Claims, 3 Drawing Sheets

(51) Int. Cl.
  *F04D 17/10* (2006.01)
  *F04D 29/08* (2006.01)
  *F24H 3/00* (2022.01)
  *B01D 45/12* (2006.01)
  *B01D 46/00* (2022.01)

(52) U.S. Cl.
  CPC ......... *B01D 46/4263* (2013.01); *F04D 17/10* (2013.01); *F04D 29/083* (2013.01); *F24H 3/002* (2013.01)

(56) References Cited

U.S. PATENT DOCUMENTS

2011/0150440 A1  6/2011  Lord et al.
2018/0119704 A1* 5/2018  Sano ..................... B01D 45/16

FOREIGN PATENT DOCUMENTS

| JP | H10-002684 A | 1/1998 |
| JP | 3979091 B2 | 9/2007 |
| JP | 2010-151360 A | 7/2010 |
| JP | 2013-514628 A | 4/2013 |
| JP | 2017176912 A * | 10/2017 |
| WO | 2016/157502 A1 | 10/2016 |

* cited by examiner

HEATER-INTEGRATED FILTER AND ROTATING MACHINE SYSTEM

TECHNICAL FIELD

The present invention relates to a heater-integrated filter that generates a seal gas which is used by a gas seal device of a rotating machine and a rotating machine system that includes a heater-integrated filter.

BACKGROUND ART

In some cases, a gas seal device is disposed in a rotating machine, such as a centrifugal compressor compressing a process gas as a fluid, so that leakage of the process gas to the outside of the machine is suppressed.

This gas seal device is disclosed in, for example, Patent Document 1.

Specifically, the gas seal device is disposed in a shaft end portion of a rotary shaft and is provided with a rotating ring and a stationary ring. The rotating ring is integrated with the rotary shaft in an outer peripheral portion of the rotary shaft, and the stationary ring is fixed to a casing and disposed to face the rotating ring in an axial direction of the rotary shaft. The stationary ring is pressed against the rotating ring by a spring. As a result, the stationary ring and the rotating ring collide with each other and a state where no gap is present is reached in a state where the rotating machine is stationary. Because a spiral-shaped groove is formed in a surface of the rotating ring that faces the stationary ring, a seal gas is introduced into the spiral-shaped groove once the rotating machine is put into operation and the rotary shaft rotates. Because of the pressure of this gas, the stationary ring is pressed along the axial direction of the rotary shaft against the biasing force of a coil spring, and then a minute gap is formed between the rotating ring and the stationary ring. Wear attributable to contact between the rotating ring and the stationary ring is suppressed by this gap, the amount of leakage of the seal gas from the gap is kept at its minimum, and the process gas is sealed in the rotating machine.

In some cases, the seal gas that is introduced into the gas seal device is generated by means of some of the process gas from the compressor. In this case, the process gas is passed through a filter, and then it becomes the seal gas by foreign matter being removed from the process gas. Depending on composition, the process gas is highly likely to be liquefied, and thus the temperature of the gas that has passed through the filter is raised by a heater, to at least a dew point temperature, in some cases.

CITATION LIST

Patent Literature

[Patent Document 1] Japanese Patent No. 3979091

SUMMARY OF INVENTION

Technical Problem

These days, the temperature of the gas that has passed through the filter is required to be raised by the heater in an increasing number of cases. A unit including the heater, however, is installed by being added to the existing gas seal device, and thus the additional installation is not easy in a case where there is a constraint in terms of installation space. Besides, space-saving effects have rarely been achieved so far by methods for additional heater unit installation.

The present invention provides a heater-integrated filter with which a space-saving effect can be achieved and a rotating machine system that includes the heater-integrated filter.

Solution to Problem

A heater-integrated filter according to a first aspect of the present invention is a heater-integrated filter taking in a portion of a fluid of a rotating machine or an external fluid and generating a seal gas for performing sealing of the fluid in the rotating machine. The heater-integrated filter includes a casing where an intake port and a discharge port are formed, the intake port taking in the portion of the fluid from the rotating machine or the external fluid and the discharge port discharging the fluid or the external fluid, a filter body disposed in the casing, the fluid from the intake port or the external fluid passing through the filter body, and rod-like heaters which are disposed inside the casing and along which the fluid or the external fluid that has passed through the filter body is capable of flowing toward the discharge port along an extension direction along an outer peripheral surface.

According to the heater-integrated filter, foreign matter can be removed from the fluid as a result of passage of the fluid (or the external fluid) taken into the casing through the filter body. Then, the temperature of the fluid is raised by the fluid flowing along the extension direction of the heater along the outer peripheral surface of the heater. Accordingly, the fluid can be discharged from the discharge port with the temperature of the fluid equal to or higher than the dew point temperature. Therefore, the fluid discharged from the discharge port can be used as the seal gas for performing sealing of the fluid in the rotating machine.

Used when the seal gas is generated here is the heater-integrated filter in which the filter body and the heater are integrally accommodated in the casing. Accordingly, there is no need to provide separate spaces for installation of the filter body and the heater.

Since the rod-like heater is used, the temperature of the fluid can be raised with greater ease and the heater can be installed with greater ease than in a case where a coil-shaped heater or the like is used.

In the heater-integrated filter according to a second aspect of the present invention, the heater according to the first aspect described above may be provided with a tubular member spaced apart from the heater so as to cover the outer peripheral surface and the fluid or the external fluid may be capable of flowing through a gap between the heater and the tubular member.

The fluid is capable of flowing along the extension direction along the outer peripheral surface of the heater by the fluid (or the external fluid) flowing through the gap between the heater and the tubular member. Accordingly, it is possible to firmly raise the temperature of the fluid with the heater and it is possible to keep the fluid at a temperature equal to or higher than the dew point temperature.

In the heater-integrated filter according to a third aspect of the present invention, the filter body according to the second aspect described above may have a tubular shape about an axis, a pair of wall portions spaced apart from each other in the direction of the axis may be provided in the casing and the wall portions may partition an inner portion of the casing into a first space, a second space, and a third space isolated from one another toward one side in the direction of the axis, the intake port may be open to the third space, the discharge port may be open to the second space, the filter body may be disposed in the first space, an introduction path may be connected to the filter body, the introduction path may be open to the third space, and the fluid or the external fluid may be capable of flowing through the introduction path, and the gap between the tubular member and the heater may allow the first space and the second space to communicate with each other.

Since the three isolated spaces are formed in the casing as described above, the fluid (or the external fluid) taken in from the intake port is introduced into the filter body through the introduction path after flowing into the third space. The fluid that has passed through the filter body flows between the heater and the tubular member and flows out into the second space after flowing out into the first space. Then, the fluid is discharged to the outside of the casing from the discharge port open to the second space. In this manner, the fluid that has passed through the filter body can be firmly increased in temperature and the fluid can be discharged from the discharge port with the temperature of the fluid equal to or higher than the dew point temperature.

The heater-integrated filter of a fourth aspect of the present invention according to any one of the first to third aspects may further include a power supply device supplying electric power to the heater, the number of the heaters may be a multiple of three, the power supply device may be a three-phase AC power supply, and the heaters may be provided so as to correspond to respective phases.

As described above, a three-phase AC power supply is used as the power supply device, and thus a commercial power supply can be used as the power supply device.

In the heater-integrated filter according to a fifth aspect of the present invention, the casing according to any one of the first to fourth aspects may include a body portion having a tubular shape about the axis and having a through-hole penetrating the body portion in the direction of the axis and a lid portion detachably covering the through-hole with respect to the body portion and supporting one end of the filter body, the heaters may be disposed inside and outside the body portion such that the extension direction is along the axis, the heaters may be provided so as to be spaced apart from each other in a circumferential direction of the casing and surround the filter body and the lid portion from an outer periphery side, and the heaters may be provided only in a region as a portion in the circumferential direction.

When the filter body is replaced, the lid portion of the casing is removed from the body portion first, and then the filter body and the lid portion are pulled out from the body portion of the casing. Subsequently, the filter body is removed from the lid portion and a new filter body is installed in the lid portion. In this aspect, the heater is provided only in the region as the portion in the circumferential direction of the casing. Accordingly, the filter body and the lid portion can be pulled out toward the radially outer side of the body portion of the casing from a heater-less region after the filter body and the lid portion are pulled out from the body portion of the casing. In this state, the existing filter body can be removed from the lid portion and the new filter body can be attached. Therefore, replacement of the filter body is facilitated.

A rotating machine system according to an eighth aspect of the present invention includes a rotating machine allowing a fluid to flow, the heater-integrated filter according to any one of the above-described first to fifth aspects generating a seal gas by taking in a portion of the fluid from the rotating machine or an external fluid, and a gas seal device provided in the rotating machine and performing sealing of the fluid in the rotating machine with the seal gas.

According to the rotating machine system, the heater-integrated filter in which the filter body and the heater are integrally accommodated in the casing is used when the seal gas is generated. Accordingly, there is no need to provide separate spaces for installation of the filter body and the heater.

Advantageous Effects of Invention

The heater-integrated filter and the rotating machine system described above are capable of achieving a space-saving effect by accommodating the filter body and the heater in the casing in an integrated manner.

DESCRIPTION OF EMBODIMENTS

Hereinafter, a compressor system (rotating machine system) 1 according to an embodiment of the present invention will be described.

Figure 1:
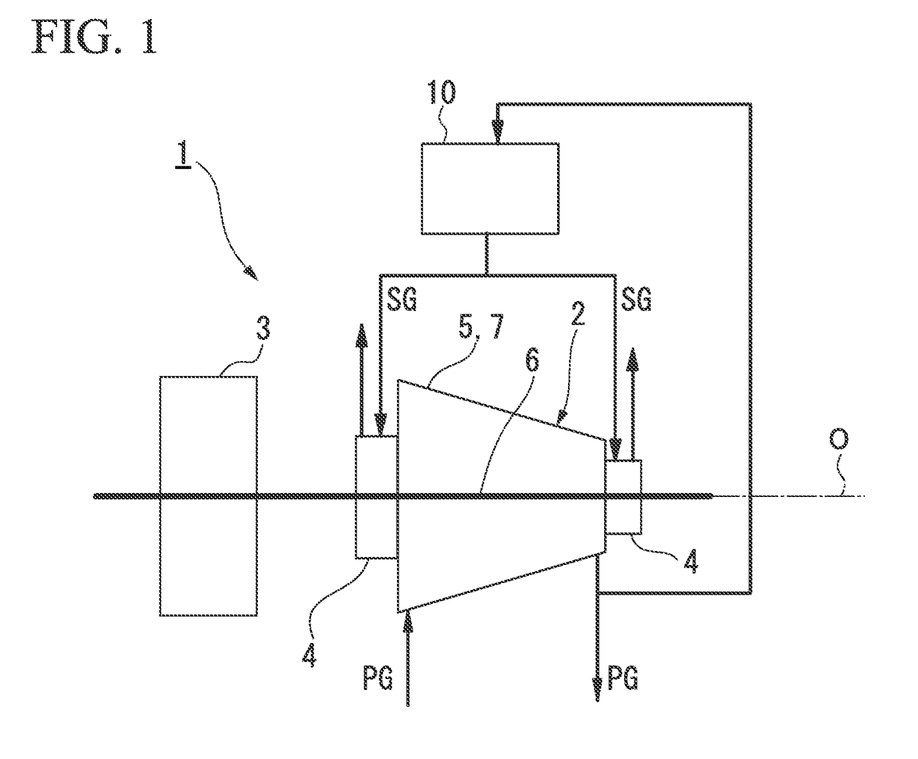
FIG. 1 is an overall configuration diagram schematically showing a compressor system according to an embodiment of the present invention.

As shown in FIG. 1, the compressor system 1 is provided with a compressor (rotating machine) 2 compressing a process gas (fluid) PG, a driving source 3 driving the compressor 2, a heater-integrated filter 10 generating a seal gas SG from a portion of the process gas PG, and gas seal devices 4 disposed on the compressor 2. The seal gas SG is supplied to the gas seal devices 4 from the heater-integrated filter 10.

The compressor 2 is, for example, a centrifugal compressor. The compressor 2 is provided with a compressor casing 5, a rotary shaft 6 disposed to be covered by the compressor casing 5 and protrude from the compressor casing 5 and rotating relative to the compressor casing 5, and a compression portion 7 such as an impeller rotating integrally with the rotary shaft 6 and compressing the process gas PG in the compressor casing 5.

The process gas PG is suctioned from one end side of the compressor casing 5 in the direction of an axis O of the rotary shaft 6 and the process gas PG is discharged from the other end side after being compressed.

Examples of the driving source 3 include an electric motor and a steam turbine. The driving source 3 provides rotational power for the rotation of the rotary shaft 6.

The gas seal devices 4 are provided at both shaft ends of the compressor casing 5 in the direction of the axis O of the rotary shaft 6. The gas seal devices 4 are attached to the compressor casing 5 to cover the rotary shaft 6 from its outer periphery. The gas seal devices 4 have a seal function, blocking the leakage of the process gas PG from a gap between the compressor casing 5 and the rotary shaft 6 by means of the seal gas SG generated in the heater-integrated filter 10.

Figure 2:
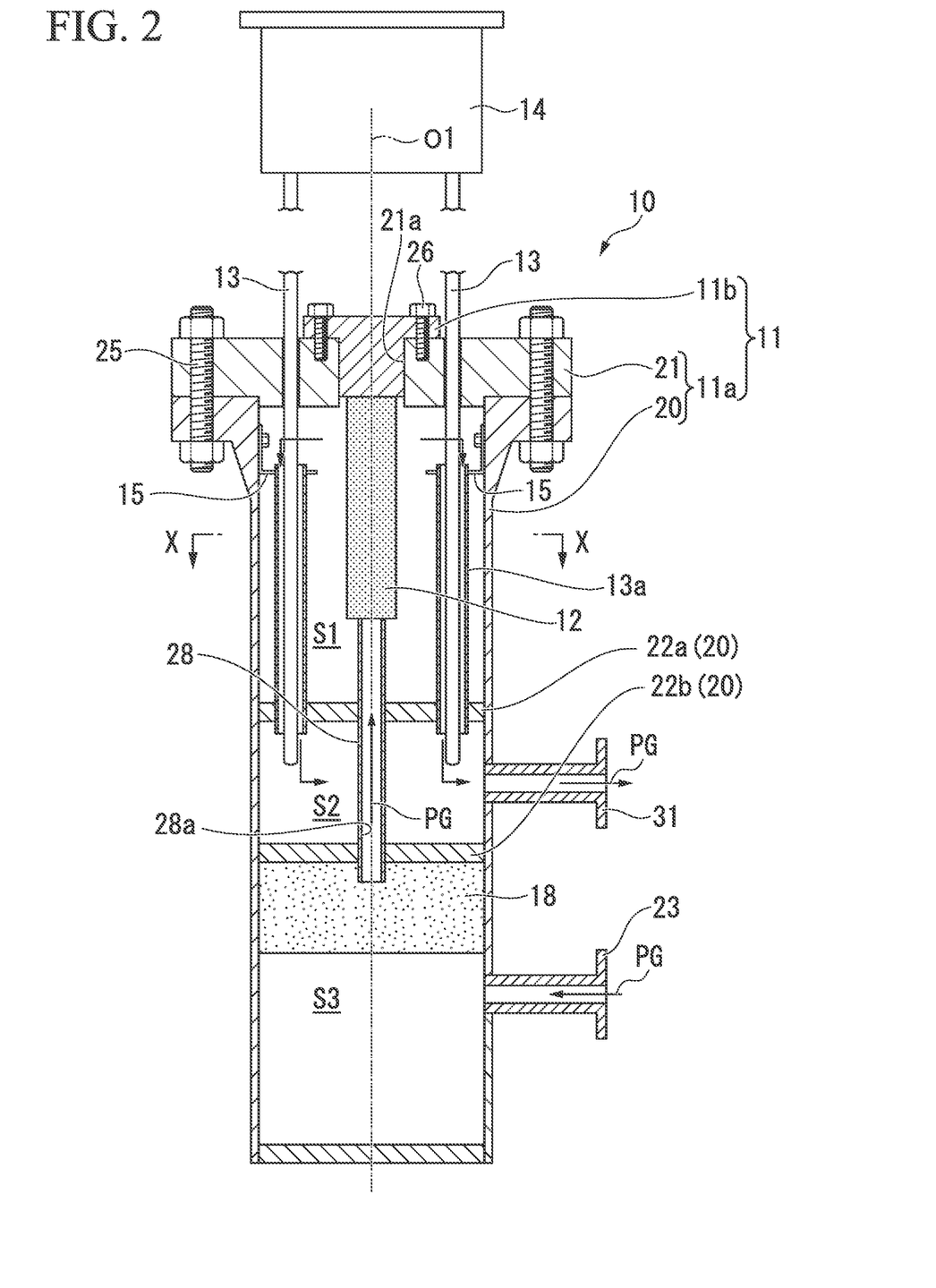
FIG. 2 is a longitudinal sectional view showing a heater-integrated filter in the compressor system according to the embodiment of the present invention.

The heater-integrated filter 10 will be described below with reference to FIGS. 2 and 3.

The heater-integrated filter 10 is provided with a tubular casing 11, a filter body (filter element) 12 accommodated in the casing 11, a heater 13 disposed between the filter body 12 and the casing 11, and a mist separator (liquid separation unit) 18 disposed in a lower portion in the casing 11.

The casing 11 has a body portion 11a having a cylindrical shape about an axis O1 and a lid portion 11b detachably attached to the upper portion of the body portion 11a.

Here, the following description assumes that the axis O1 vertically extends. Actually, however, the axis O1 may extend in any direction. In addition, the upward-downward direction of the heater-integrated filter 10 is not limited to the case of the present embodiment.

The body portion 11a has a body section 20 having a bottomed cylindrical shape about the axis O1 and a cover 21 detachably covering the upper portion of the body section 20. The cover 21 forms a disc shape about the axis O1. The cover 21 is fixed to, for example, the body section 20 by a bolt 25. Accordingly, the cover 21 is detachably provided on the body section 20. As a result, the casing 11 has an openable inner portion. It should be noted that the cover 32 of the present embodiment is detachable from the body section 20 with the heater 13, which will be described later.

Although the cover 21 is provided only on the upper portion in the present embodiment, a cover may be similarly provided for the lower portion of the casing 11 for the inner portion of the casing 11 to be openable.

A through-hole 21a is formed in the cover 21. The through-hole 21a is formed at the center position of the cover 21. The through-hole 21a is circular about the axis O1.

The lid portion 11b is provided so as to be detachable with respect to the cover 21 by means of, for example, a bolt 26 so as to cover the through-hole 21a from above.

In addition, the casing 11 is provided with a pair of partition plates (wall portions) 22 that partition the internal space of the casing 11 into three spaces in the direction of the axis O1 at the midway position in the direction of the axis O1.

A first plate 22a and a second plate 22b as the partition plates 22 are sequentially provided toward one side (the lower side) in the direction of the axis O1. In addition, the three spaces are defined as a first space S1, a second space S2, and a third space S3 sequentially toward one side (the lower side) of the axis O1. These spaces are isolated from one another. Accordingly, no fluid passes between the partition plates 22 and the inner surface of the body portion 11a of the casing 11.

Here, a method for providing the partition plates 22 in the casing 11 will be exemplified in detail. In other words, a projection (not shown) protruding toward the axis O1 from the inner surface of the body section 20 of the body portion 11a of the casing 11 is formed at the midway position in the extension direction of the casing 11. The separately manufactured partition plates 22 are provided so as to be placed on this projection.

The casing 11 is provided with an intake port 23. The intake port 23 is provided on the peripheral surface of the body portion 11a of the casing 11 so as to be open to the third space S3 below the second plate 22b in the casing 11. In other words, the intake port 23 is disposed below the second plate 22b. The intake port 23 protrudes radially outward from the outer peripheral surface of the body section 20 of the casing 11.

As shown in FIG. 1, a portion of the process gas PG from the discharge side of the compressor 2 is introduced into the intake port 23 and this process gas PG flows into the third space S3.

In addition, the casing 11 is provided with a discharge port 31. The discharge port 31 is provided on the peripheral surface of the body section 20 of the casing 11 so as to be open to the second space S2 sandwiched between the first plate 22a and the second plate 22b in the casing 11. The discharge port 31 protrudes radially outward from the outer peripheral surface of the body section 20 of the casing 11.

The filter body 12 is made of stainless steel or a heat-resistant fiber such as a silicon carbide fiber, an alumina fiber, and a ceramic fiber. In addition, the filter body 12 is disposed in the first space S1 in the casing 11.

The filter body 12 has a tubular shape. One end (the upper end) of the filter body 12 is fixed to the lower surface of the lid portion 11b and supported by the lid portion 11b. The outer diameter of the filter body 12 is smaller than the inner diameter of the through-hole 21a of the cover 21. An introduction pipe 28 about the axis O1 is connected to the lower end of the filter body 12. The introduction pipe 28 is provided so as to be inserted into the filter body 12 without being fixed to the filter body 12. The introduction pipe 28 penetrates the first plate 22a and the second plate 22b in the direction of the axis O1 and is disposed over all of the first space S1, the second space S2, and the third space S3. An introduction path 28a is formed in the introduction pipe 28. In this manner, one end of the introduction path 28a is open to the third space S3 and the other end of the introduction path 28a is connected to the filter body 12.

The heater 13 has a rod shape extending along the axis O1 in the casing 11. In the present embodiment, a plurality of the heaters 13 are disposed so as to surround the filter body 12 from the outer periphery side. The heater 13 penetrates the cover 21 in the direction of the axis O1 and is provided inside and outside the casing 11 at a position radially outside the lid portion 11b. As a result, the heater 13 is fixed to and supported by the cover 21. In addition, the heater 13 penetrates the first plate 22a in the direction of the axis O1 at a position radially outside the introduction pipe 28.

Figure 3:
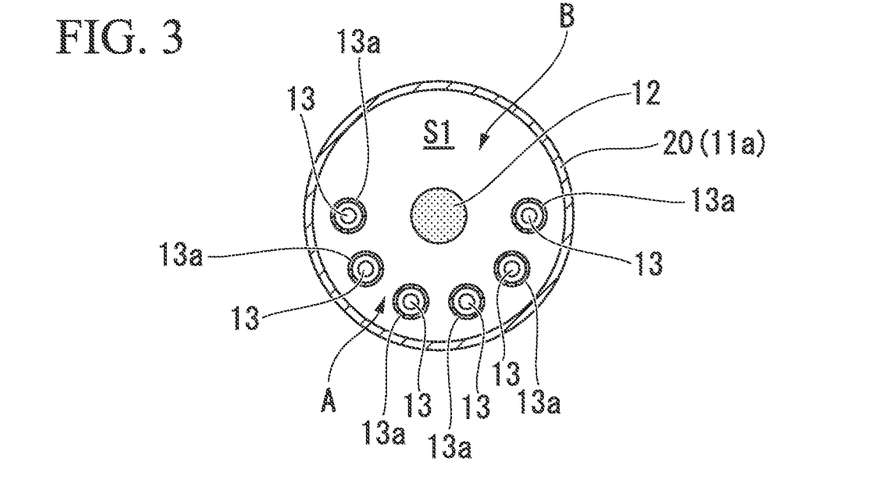
FIG. 3 is a diagram showing the heater-integrated filter in the compressor system according to the embodiment of the present invention, which is a sectional view taken along line X-X of FIG. 2.

In the present embodiment, six heaters 13 are circumferentially spaced apart from each other as shown in FIG. 3. In other words, in the present embodiment, the number of the heaters 13 is a multiple of three. However, the number of the heaters 13 is not particularly limited. As shown in FIG. 3, the heaters 13 are lopsidedly provided only in a region A, which is a circumferential portion. In other words, a region B where no heater 13 is provided is present in a circumferential portion.

Each of the heaters 13 is provided with a tubular member 13a. The tubular member 13a is provided coaxially with the heater 13 and is provided so as to cover the heater 13 from the outer periphery side. A gap is provided between the heater 13 and the tubular member 13a. The lower end of the tubular member 13a penetrates the first plate 22a and the lower end of the tubular member 13a is fixed to the first plate 22a. The upper end of the tubular member 13a is fixed to a bracket 15 provided so as to protrude radially inward from the inner peripheral surface of the body section 20 of the casing 11. As a result, the tubular member 13a is provided across the boundary between the first space S1 and the second space S2. The gap between the heater 13 and the tubular member 13a allows the first space S1 and the second space S2 to communicate with each other.

Each of the heaters 13 is connected to a power supply device 14. The power supply device 14 is disposed above the lid portion 11b. In the present embodiment, the power supply device 14 is a three-phase AC power supply, and the heaters 13 correspond to U, V, and W phases, respectively. In the present embodiment, six heaters 13 are provided along with one power supply device 14.

A cyclone-type mist separator is adopted as the mist separator 18. Examples of the cyclone-type mist separator include a mist separator in which a spiral flow path (not shown) is formed. The mist separator 18 is disposed at a position adjacent to the second plate 22b and between the intake port 23 and the introduction pipe 28. In other words, the mist separator 18 is provided in the third space S3. The mist separator 18 removes a liquid from the process gas PG that has flowed into the third space S3 from the intake port 23. The liquid removed by the mist separator 18 is discharged to the outside of the casing 11 through a drain discharge port (not shown).

The flow of the process gas PG in the compressor system 1 described above will be described. In other words, a portion of the process gas PG taken in from the intake port 23 flows into the third space S3. Subsequently, the process gas PG flows into the introduction path 28a of the introduction pipe 28 from the third space S3 and is introduced into the filter body 12.

Subsequently, the process gas PG passes through the filter body 12 and flows out from the outer surface of the filter body 12 to the first space S1. Then, the process gas PG flows into the gap between the heater 13 and the tubular member 13a from above the tubular member 13a and flows downward. As a result, the process gas PG flows along the outer peripheral surface of the heater 13 along the extension direction of the heater 13, that is, in the direction of the axis O1.

Subsequently, the process gas PG flows out from the lower end of the tubular member 13a to the second space S2. Finally, the process gas PG in the second space S2 is discharged to the outside of the casing 11 through the discharge port 31.

The compressor system 1 of the present embodiment described above is provided with the heater-integrated filter 10. Accordingly, foreign matter can be removed from the process gas PG as a result of passage of the process gas PG taken into the casing 11 through the filter body 12. It is possible to raise the temperature of the process gas PG by causing the foreign matter-removed process gas PG to flow along the extension direction of the rod-like heater 13.

Accordingly, the process gas PG can be discharged from the discharge port 31 with the temperature of the process gas PG equal to or higher than the dew point temperature. Therefore, the process gas PG discharged from the discharge port 31 can be used as the seal gas SG for performing sealing of the process gas PG in the compressor 2.

Used when the seal gas SG is generated in this manner is the heater-integrated filter 10 in which the filter body 12 and the heater 13 are integrally accommodated in the casing 11. Accordingly, there is no need to provide separate spaces for installation of the filter body 12 and the heater 13. Therefore, it is possible to save the space of the entire apparatus generating the seal gas SG from the process gas PG Since the rod-like heater 13 is used, the temperature of the process gas PG can be raised with greater ease and the heater 13 can be installed with greater ease than in a case where a coil-shaped heater or the like is used.

In the present embodiment, the process gas PG is capable of flowing in the vicinity of the heater 13 along the extension direction of the heater 13 by the process gas PG flowing through the gap between the heater 13 and the tubular member 13a. Accordingly, it is possible to increase the effect of raising the temperature of the process gas PG.

In the casing 11, the first space S1, the second space S2, and the third space S3 are formed so as to be isolated from one another. Accordingly, it is possible to avoid the process gas PG that has flowed into the third space S3 from the intake port 23 flowing into the second space S2 as it is without passing through the filter body 12 and the heater 13 and being discharged to the outside of the casing 11 from the discharge port 31. Therefore, the process gas PG can be reliably filtered and increased in temperature.

The power supply device 14 is a three-phase AC power supply. Accordingly, a commercial power supply can be used as the power supply device 14.

When the heater 13 and the filter body 12 are replaced, the bolt 26 fixing the lid portion 11b is removed first, and then the lid portion 11b is pulled upward. As a result, the filter body 12 and the lid portion 11b are pulled out from the casing 11 through the through-hole 21a. At this time, the filter body 12 and the introduction pipe 28 are separated from each other and the introduction pipe 28 remains disposed in the casing 11.

In the present embodiment, the heater 13 is provided only in the region A as a circumferential portion although the heater 13 extends to a position above the cover 21. Accordingly, the filter body 12 that has been pulled up above the lid portion 11b is pulled out radially outward (upward toward the page of FIG. 3) from the circumferential region B provided with no heater 13, and thus the filter body 12 can be separated from the casing 11. Subsequently, the existing filter body 12 can be removed from the lid portion 11b and the new filter body 12 can be attached to the lid portion 11b. Therefore, replacement of the filter body 12 is facilitated.

Some embodiments of the present invention have been described in detail above with reference to the drawings. The configurations of the respective embodiments, their combinations, and so on are simply examples, and any addition, omission, replacement, and modification of configurations is allowed without departing from the scope of the present invention. In addition, the present invention is not limited by the embodiments and the present invention is limited only by the scope of claims.

For example, the number of the heaters 13 is not limited to a multiple of three unless the power supply device 14 is a three-phase AC power supply.

The disposition of the intake port 23 and the discharge port 31 is not limited to the above-described case. In other words, the intake port 23 and the discharge port 31 may be disposed such that the process gas PG flowing in from the intake port 23 is discharged from the discharge port 31 after passing through the heater 13.

The tubular member 13a does not necessarily have to be provided in the heater 13. In other words, the process gas PG has only to be capable of flowing along the extension direction of the heater 13 along the outer peripheral surface of the heater 13.

The mist separator 18 is optional. For example, the mist separator 18 will not be necessary if the process gas PG is a dried gas.

Two units of the heater-integrated filter 10 may be disposed in parallel for one of the two to be used during maintenance of the other one.

In the embodiment described above, the seal gas SG is generated from some of the process gas PG from the discharge side of the compressor 2. The seal gas SG may also be generated by an external fluid being taken in. Examples of the external fluid include the process gas PG (external process gas PG) that has yet to be taken into the compressor system 1 and a fluid outside the system that differs from the process gas PG

INDUSTRIAL APPLICABILITY

The heater-integrated filter and the compressor system described above are capable of achieving a space-saving effect by accommodating the filter body and the heater in the casing in an integrated manner.

REFERENCE SIGNS LIST

1 Compressor system (rotating machine system)
2 Compressor (rotating machine)
3 Driving source
4 Gas seal device
5 Compressor casing
6 Rotary shaft
7 Compression portion
10 Heater-integrated filter
11 Casing
11a Body portion
11b Lid portion
12 Filter body
13 Heater
13a Tubular member
14 Power supply device
15 Bracket
18 Mist separator
20 Body section
21 Cover
21a Through-hole
22 Partition plate (wall portion)
22a First plate
22b Second plate
23 Intake port
25 Bolt
26 Bolt
28 Introduction pipe
28a Introduction path
31 Discharge port
PG Process gas
SG Seal gas
O Axis
O1 Axis
S1 First space
S2 Second space
S3 Third space

What is claimed is:

1. A heater-integrated filter taking in a portion of a fluid of a rotating machine or an external fluid and generating a seal gas for performing sealing of the fluid in the rotating machine, the heater-integrated filter comprising:
    a casing where an intake port and a discharge port are formed, the intake port taking in the portion of the fluid from the rotating machine or the external fluid and the discharge port discharging the fluid or the external fluid;
    a filter body disposed in the casing, the fluid from the intake port or the external fluid passing through the filter body; and
    rod-shaped heaters which are disposed inside the casing and along which the fluid or the external fluid that has passed through the filter body is capable of flowing toward the discharge port along an extension direction along an outer peripheral surface, wherein the casing includes a body portion having a tubular shape about an axis and having a through-hole penetrating the body portion in the direction of the axis and a lid portion detachably covering the through-hole with respect to the body portion and supporting one end of the filter body, and
the heaters are disposed inside and outside the body portion such that the extension direction is along the axis, the heaters are provided so as to be spaced apart from each other in a circumferential direction of the casing, and the heaters are provided only in a region as a portion in the circumferential direction.

2. The heater-integrated filter according to claim 1, wherein
    the heater is provided with a tubular member spaced apart from the heater so as to cover the outer peripheral surface, and
    the fluid or the external fluid is capable of flowing through a gap between the heater and the tubular member.

3. The heater-integrated filter according to claim 2, wherein
    the filter body has a tubular shape about an axis,
    a pair of wall portions spaced apart from each other in the direction of the axis are provided in the casing and the wall portions partition an inner portion of the casing into a first space, a second space, and a third space isolated from one another toward one side in the direction of the axis,
    the intake port is open to the third space,
    the discharge port is open to the second space,
    the filter body is disposed in the first space, an introduction path is connected to the filter body, the introduction path is open to the third space, and the fluid or the external fluid is capable of flowing through the introduction path, and
    the gap between the tubular member and the heater allows the first space and the second space to communicate with each other.

4. The heater-integrated filter according to claim 3, further comprising a power supply device supplying electric power to the heater, wherein
    the number of the heaters is a multiple of three, and
    the power supply device is a three-phase AC power supply and the heaters are provided so as to correspond to respective phases.

5. The heater-integrated filter according to claim 2, further comprising a power supply device supplying electric power to the heater, wherein
    the number of the heaters is a multiple of three, and
    the power supply device is a three-phase AC power supply and the heaters are provided so as to correspond to respective phases.

6. The heater-integrated filter according to claim 1, further comprising a power supply device supplying electric power to the heater, wherein
    the number of the heaters is a multiple of three, and
    the power supply device is a three-phase AC power supply and the heaters are provided so as to correspond to respective phases.

7. A rotating machine system comprising:
    a rotating machine allowing a fluid to flow;
    the heater-integrated filter according to claim 1 generating a seal gas by taking in a portion of the fluid from the rotating machine or an external fluid; and a gas seal device provided in the rotating machine and performing sealing of the fluid in the rotating machine with the seal gas.

\* \* \* \* \*